US012137717B2

United States Patent
Timmer-Keetels et al.

(10) Patent No.: US 12,137,717 B2
(45) Date of Patent: Nov. 12, 2024

(54) NUTRITIONAL COMPOSITIONS SHOWING PHASE SEPARATION UNDER GASTRIC CONDITIONS AND METHODS FOR PREPARING THE SAME

(71) Applicant: FrieslandCampina Nederland B.V., Amersfoort (NL)

(72) Inventors: Christina Josephina Antonia Maria Timmer-Keetels, Wageningen (NL); Andries Dirk Siemensma, Wageningen (NL); Glenn Arnoldus Antonius Van Lieshout, Wageningen (NL); Thom Huppertz, Wageningen (NL); Johannes Andries Nieuwenhuijse, Wageningen (NL); Renate Antonia Ganzevles, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 471 days.

(21) Appl. No.: 17/431,968

(22) PCT Filed: Mar. 26, 2020

(86) PCT No.: PCT/EP2020/058469
§ 371 (c)(1),
(2) Date: Aug. 18, 2021

(87) PCT Pub. No.: WO2020/200989
PCT Pub. Date: Oct. 8, 2020

(65) Prior Publication Data
US 2022/0132901 A1  May 5, 2022

(30) Foreign Application Priority Data
Mar. 29, 2019 (EP) .................... 19166285

(51) Int. Cl.
*A23L 33/115* (2016.01)
*A23L 33/19* (2016.01)

(52) U.S. Cl.
CPC ............ *A23L 33/115* (2016.08); *A23L 33/19* (2016.08)

(58) Field of Classification Search
None
See application file for complete search history.

(56) References Cited

U.S. PATENT DOCUMENTS

2003/0219510 A1* 11/2003 Kent ...................... A23C 13/16
426/34
2006/0188614 A1  8/2006 Shapira
(Continued)

FOREIGN PATENT DOCUMENTS

EP         2296494 B1    3/2012
WO       2010027259      3/2010
(Continued)

OTHER PUBLICATIONS

Ye: Behaviour of Fat Globules and Membrane Proteins under Different Processing Environments as Related to Milk Powder Manufacture; Masset University Food Technology Doctor of Philosophy Thesis; 2003. (Year: 2003).*
Baars, Annemarie, et al.; "Milk fat globule membrane coating of large lipid droplets in the diet of young mice prevents body fat accumulation in adulthood", British Journal of Nutrition, vol. 115, No. 11, Apr. 4, 2016, pp. 1930-1937.
(Continued)

*Primary Examiner* — Patricia A George
(74) *Attorney, Agent, or Firm* — Fitch, Even, Tabin & Flannery LLP

(57) ABSTRACT

The invention relates to the field of nutritional compositions, methods for providing them and uses thereof. More in particular, it relates to ready-to-feed and powdered infant or growing up milk formulas showing desirable gastric digestion properties. Provided is a nutritional composition comprising casein, whey proteins comprising α-lactalbumin
(Continued)

Figure 1:
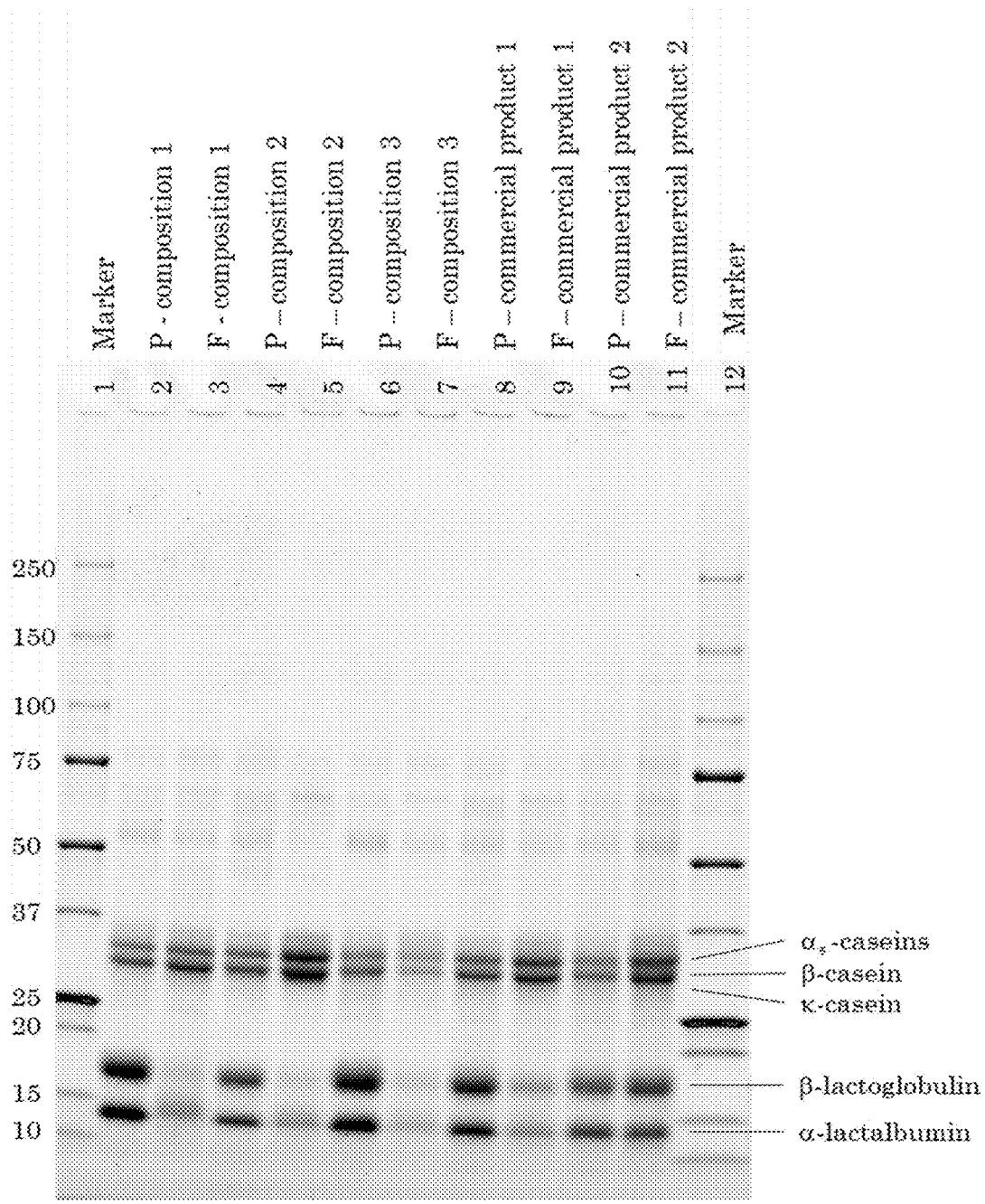

(aLAc) and β-lactoglobulin (bLac), and protein-coated fat droplets, wherein (i) the protein content of the composition is 5 to 20% (w/w), preferably 7-16 w %, based on total solids; (ii) the aLac+bLac content is at least 25% (w/w) based on the total protein level; (iii) the fat content is in the range of 10% to 50% (w/w) based on total solids; and (iv) the fat droplets are coated with an average protein load of 2-10 mg/m2 and wherein the weight ratio of casein:(aLac+bLac) on the fat droplets is at least 4 times higher, preferably at least 4.5 times higher, than the weight ratio of casein:whey protein in the total composition.

25 Claims, 5 Drawing Sheets

(56) References Cited

U.S. PATENT DOCUMENTS

| | | | |
|---|---|---|---|
| 2013/0052297 | A1 | 2/2013 | Van De Heijning |
| 2016/0219915 | A1 | 8/2016 | Van Der Beek |

FOREIGN PATENT DOCUMENTS

| | | |
|---|---|---|
| WO | 2016163881 | 10/2016 |
| WO | 2016163882 | 10/2016 |

OTHER PUBLICATIONS

Ballard, Olivia, et al.; "Human Milk Composition", Pediatric Clinics of North America, vol. 60, No. 1, Feb. 1, 2013, pp. 49-74.

Bourlieu, Claire, et al.; "The structure of infant formulas impacts their ipolysis, proteolysis and disintegration duringin vitrogastric digestion", Food Chemistry, Elsevier Ltd, NL, vol. 182, Mar. 6, 2015, pp. 224-235.

El-Loly, "Bovine milk immunoglobulins in relation to human health", International Journal of Dairy Science, vol. 2, No. 3, Jan. 1, 2007, pp. 183-195.

Gallier, Sophie, et al.; "In vivodigestion of bovine milk fat globules: Effect of processing and interfacial structural changes. I. Gastric digestion"food Chemistry, Elsevier Ltd, NL, vol. 141, No. 3, Jun. 14, 2013, pp. 3273-3281.

International Search Report and Written Opinion, date of mailing May 7, 2020 International application No. PCT/EP2020/058469 (11 pgs.).

Layman, Donald K., et al.; "Applications for [alpha]-lactalbumin in human nutrition", Nutrition Reviews, vol. 76, No. 6, Mar. 29, 2018, pp. 444-460.

Lee, Hanna, et al.; "Compositional Dynamics of the Milk Fat Globule and Its Role in Infant Development", Frontiers in Pediatrics, vol. 6, Oct. 24, 2018, pp. 1-21.

Sorva, Ritva, et al.; "Immunodeficiency and other clinical immunology", J Allerg Clin Immunol, Apr. 1, 1994, pp. 787-792.

* cited by examiner

NUTRITIONAL COMPOSITIONS SHOWING PHASE SEPARATION UNDER GASTRIC CONDITIONS AND METHODS FOR PREPARING THE SAME

CROSS REFERENCE TO RELATED APPLICATIONS

This application is a U.S. national phase application of International Application No. PCT/EP2020/058469, filed Mar. 26, 2020, which claims benefit from European Patent Application No. 19166285.7, filed Mar. 29, 2019, which are each hereby incorporated herein by reference in their entirety.

FIELD

The invention relates to the field of nutritional compositions, methods for providing them and uses thereof. More in particular, it relates to ready-to-feed and powdered infant and growing up milk formulas showing desirable gastric digestion properties.

BACKGROUND

It has been considered for a long time by nutritionists that the best food or nutrition supplied to an infant is its own mother's milk; i.e. fresh human milk. It is recognized, however, that many situations arise wherein the infant cannot be fed mother's milk and as a result cows' milk based formulas have been prepared and used to nourish an infant. These formulas contain a mixture of casein and whey proteins to provide an amino acid profile as close as possible to that of mother's milk. Much effort has been made to improve infant milk formulas to more closely mimic mother's milk.

The protein systems of human milk and cows' milk differ substantially, both quantitatively and qualitatively. Prominent quantitative differences include a lower total protein content, often expressed as the total nitrogen content multiplied by 6.25 or 6.38, of human milk (11 g/L) compared to cows' milk (33-35 g/L). "Increasing evidence indicates that, relative to breastfed infants, a higher protein intake in formula fed infants causes an early rapid weight gain during the first year of life which may affect body composition later in life. Another difference is that human milk does not comprise ß-lactoglobulin (bLac).

Total nitrogen containing components in milk can be divided into true protein and non-protein nitrogen (NPN), with caseins and serum proteins (the latter also called whey proteins) as the main classes of proteins. Caseins are the proteins from milk that precipitate at pH 4.6, whereas whey proteins remain soluble at this pH. In mature human milk, the ratio of whey protein to casein is about 60:40 to 50:50, whereas the whey protein to casein ratio is approximately 18:82 in cows' milk. The casein fraction in cows' milk comprises $\alpha_{a1}$-, $\alpha_{s2}$, β- and κ-casein, whereas $\alpha_{s2}$-casein seems to be absent in human milk. Also the composition of the whey protein fraction differs between human and cows' milk. The most abundant whey proteins in human milk are α-lactalbumin, lactoferrin and immunoglobulins, whereas the whey protein fraction of cows' milk comprises approximately ~50% β-lactoglobulin and ~15% α-lactalbumin.

The fat content of human milk increases throughout expression, which means that the composition of the product entering the infant's stomach is dynamic in composition. Foremilk usually contains only 2% fat, whereas the fat content of hindmilk can be 8% or even higher. This results in initial ingestion of breastmilk with a lower caloric value, followed by an increase in caloric value with increasing fat content. As a consequence, the gastric emptying that is mostly regulated by caloric value, follows a biphasic, "phased" pattern with an initial fast emptying of the watery phase and a delayed emptying of fat. In contrast, conventional infant formulas are typically of a homogeneous nature, and therefore empty with a constant caloric value at a more constant and slower rate when compared to breastmilk.

Hence, it is not only important to prepare an infant milk formula by the appropriate blending of nutritional ingredients, including varying proportions of selected vegetable fats optionally combined with milk fat to yield a composition approximating that of human milk, but also to assure an optimal absorption of the nutrients by phasing the digestion and stomach emptying. This will help to prevent an overload of protein and fat in the intestine and hence will lead to a beneficial health impact with respect to gastrointestinal comfort, energy regulation and metabolic health. Overall, optimized digestion and absorption-kinetics of formula may further contribute to a normal healthy growth as observed with breastfed infants.

In an attempt to develop a method of feeding infants that provides a gradual increase of fat content that is similar to that of the breast feeding, US2006/188614 discloses a method comprising the steps of (a) feeding the infant by foremilk equivalent having a volume of, for example, 30-60% of a total meal and a fat percentage of for example, 2.5-3.5%; and (b) feeding the infant by hindmilk equivalent having a volume of, for example, 40-70% of the total meal and a percentage of fat of, for example, 3.7-5.5%. To that end, it is proposed that the feeding is performed with a bottle which is divided into two compartments, one being filled with the foremilk equivalent and the other with the hindmilk equivalent, the bottle being designed in such a manner enabling the infant to consume at first the foremilk equivalent and thereafter the hindmilk equivalent gradually admixed with the foremilk equivalent. A drawback of this approach is that multiple compositions need to be prepared and administered, each in the desired amounts.

EP2296494B1 aims at providing a single nutritional composition that can mimic the concentration differences in fat of human milk. Disclosed is an infant formula having a sufficient amount of fat droplets with an increased diameter (5-25 μm) compared to standard infant milk formula. Due to the differences in densities between the fat and water, the fat droplets will "cream" to result in an increased fat concentration in the upper part of the container e.g. a drinking bottle compared to the lower part of the container. However, it can take a considerable time before such a fat gradient is established in the bottle. E.g. even when droplets have a size of 15 micron, one can calculate that the creaming will take a long time. (e.g. approximately 1 hour for a droplet of this size to cream a few (e.g. 3-6) centimeters). Moreover, such an infant milk will be inhomogeneous, which is usually not perceived as very attractive.

DETAILED DESCRIPTION

The present inventors therefore aimed at developing a nutritional composition based on bovine milk that mimics the phased release of breastmilk without having to rely on establishing a fat gradient prior to administering the composition to an infant. Ideally, the composition is stable and homogenous, and does not induce creaming or the formation of visible "fat eyes" in the drinking bottle. Furthermore, such 'phased release' composition can preferably be manufactured in a manner that minimally affects biological activity provided by bovine milk immunoglobulins (Igs).

At least some of these goals were met by the surprising finding that fat creaming in the stomach can be induced by a milk formula comprising fat droplets that are coated predominantly with the milk-derived caseins. Caseins are hydrolyzed in the stomach very fast (even at pH 6). Since hydrolyzed caseins on the interface of the fat droplet and the remaining aqueous composition are unstable, the droplets start to flocculate and large fat containing particles are formed which start to cream. Normally, fat droplets in infant formula have a diameter of approximately 0.5 micrometer. Fat droplets of this size, coated with mainly caseins, will flocculate in "early" gastric digestion (pH 6.0 to pH 5.5), to result in phase separation into a bottom layer low in fat and an upper layer enriched in fat. Herewith, gastric emptying of such a nutritional composition involves an initial low-fat phase that is followed by a (delayed) phase of fat entry into the intestines.

Accordingly, the invention relates to a nutritional composition comprising casein, whey proteins comprising α-lactalbumin (aLac) and ß-lactoglobulin (bLac), and protein-coated fat droplets, wherein
  (i) the protein content of the composition is 5 to 20% (w/w), preferably 7-16 w %, based on total solids;
  (ii) the aLac+bLac content is at least 25% (w/w) based on the total protein level;
  (iii) the fat content is in the range of 10% to 50% (w/w); and
  (iv) the protein-coated fat droplets are coated with an average protein load of 2-15 mg/m2 and wherein the weight ratio of casein:(aLac+bLac) on the fat droplets is at least 4 times higher than the weight ratio of casein:(aLac+bLac) in the total composition.

The concept of covering/coating fat droplets with a protein load that is enriched in caseins as disclosed in the present invention is not taught or suggested in the art. It has been reported that modification of fat droplets (also referred to in the art as "lipid globules") can be used to modulate the rate and extent of protein aggregate formation in the stomach and/or to increase the gastric emptying rate. However, these approaches focused on coating the fat droplets with defined lipid components.

For example, WO2010/027259 relates to the field of infant milk formula and growing up milks for preventing obesity later in life. It discloses a nutritional composition comprising 10 to 50 wt. % vegetable lipids based on dry weight of the composition, and i) 0.5 to 20 wt. % phospholipids based on total lipids or ii) 0.6 to 25 wt. % of polar lipids based on total lipids, wherein polar lipids are the sum of phospholipids, glycosphingolipids and cholesterol, and said composition comprising lipid globules with a core comprising said vegetable lipids and a coating comprising said phospholipids or polar lipids.

WO2016/163882 relates to a method for reducing the rate and extent of protein aggregate formation in the stomach and/or increasing the gastric emptying rate in a subject, comprising administering to the subject a nutritional composition comprising carbohydrates, protein, and lipid globules, wherein the protein comprises casein and the lipid globules comprise triglycerides derived from vegetable fat and phospholipids derived from non-human mammalian milk. The lipid globules have a mode diameter from 2 to 6 µm and/or a specific surface area from 0.5 to 15 $m^2$/g lipid, and the lipid globules comprise a coating comprising the phospholipids.

A nutritional composition of the present invention comprises casein, whey proteins, in particular α-lactalbumin and ß-lactoglobulin, and protein-coated fat droplets.

The total protein content of the composition is 5 to 20% (w/w), preferably 7-16 w %, based on total solids. The total amount of α-lactalbumin and ß-lactoglobulin is at least 25% (w/w) based on the total protein level.

In one embodiment, the composition of the invention has a low protein content, i.e. the protein content in the composition of the invention is less than 4 g per 100 kCal, e.g. less than 3.8 g per 100 kCal, preferably less than 3.0 g/100 kCal, more preferably less than 2 g/100 kCal. Even more preferably, the protein content in the composition of the invention is between 0.95 g and 3.8 g per 100 kCal, particularly preferably between 1.0 g and 2.5 g per 100 kCal, most preferably between 1.6 and 1.8 g per 100 kCal.

The α-lactalbumin and β-lactoglobulin for use in the present invention can be derived from any suitable whey protein source. For example, either one or both of α-lactalbumin and β-lactoglobulin is derived from milk, from cheese whey, from acid casein whey or from milk serum or from concentrated, diluted, demineralized or powdered variants thereof. In addition to α-lactalbumin and β-lactoglobulin, a composition of the invention may contain further whey proteins, such as serum albumin, lactoferrin and/or immunoglobulins. In a specific aspect, it contains all "non-casein" proteins as found in bovine milk.

To allow for optimal protein digestion, the α-lactalbumin and β-lactoglobulin in a composition of the invention are predominantly in a native state e.g. from the total amount of α-lactalbumin and β-lactoglobulin >50% is soluble at pH 4.6. Preferably, at least 60% of the α-lactalbumin and ß-lactoglobulin is native, more preferably at least 80%, most preferably at least 90%, or at least 95%. This is suitably achieved by using proteins that have not been exposed temperatures above 85° C. (e.g. UHT treatment) at which >50% of the whey proteins denature. Preferably, sources of aLac and bLac are used that have undergone at least one heat treatment of 15 s at 72° C. or an equivalent "mild" heat treatment.

Likewise, the casein can be obtained from conventional sources. In one embodiment, the casein is selected from the group consisting of micellar casein, non-micellar casein, acid casein, calcium caseinate, magnesium caseinate, sodium caseinate, potassium caseinate and ammonium caseinate, or any combination thereof. The casein can for example be obtained from whole milk, skimmed milk and/or milk protein concentrate.

Typically, the weight ratio of caseins to total whey proteins (i.e. α-lactalbumin, ß-lactoglobulin, and optional further whey proteins) in a nutritional composition is in the range of 70:30-20:80, for example 60:40-20:80, 55:45-25:75 or 50:50:20:80. Preferably, the weight ratio of caseins to total whey proteins is in the range of 50:50-30:70.

The fat content of a nutritional composition is in the range of 10% to 50% (w/w) based on total solids. In one embodiment, the fat content is 15-40% (w/w), preferably 25-35 w %. Whereas the weight ratio of total fat to total protein is not critical, it is preferably in the range of 3.5:1-1:1.5.

Preferably, the fat is homogenized in order to obtain a stable and homogeneous product wherein the fat is predominantly present in the composition in the form of protein-coated fat droplets. In one aspect, the fat droplets have a core that consists of at least 90 w %, preferably at least 95 w % of triglycerides. The fat droplets typically have an average diameter in the range of 0.2 to 1.0 micron, preferably 0.3 to 0.8 micron, i.e. much smaller than that of human milk or the synthetic composition of EP2296494B1. Besides caseins and whey proteins, the fat droplet surface may contain milk fat globule membrane (MFGM) material.

Any type of fat source commonly used in nutritional (infant) formulas can be used. The fat component of infant formulas has traditionally been considered the most important energy source for the infant as well as a necessary requirement for normal growth and development. The Codex Standard established for the amount of fat in an infant formula is not less than 3.3 grams and not more than 6.0 grams per 100 available kilocalories. Fat provides approximately 9 kilocalories per gram. Consequently, fat contributes between 30 percent and 54 percent of available kilocalories in an infant formula. In most commercial infant formulas, fat provides about half of the food energy.

The nutritional composition of the invention is a synthetic nutritional composition, i.e. it is produced by humans. The nutritional composition of the invention is not milk from a mammal, such as human milk.

In one embodiment, the fat source is a dairy milk fat, a vegetable oil, a vegetable fat, a hydrogenated vegetable oil, a marine oil, an algae oil, single cell oil or a mixture of any of the foregoing. The fat source preferably has a ratio of n-6 to n-3 fatty acids of about 5:1 to about 15:1; for example, about 8:1 to about 10:1. In a preferred aspect, the composition comprises a dairy milk fat, more preferably a dairy milk fat selected from the group consisting of whole milk, cream, anhydrous milk fat and fractions from milk fat. In one embodiment, a combination of a dairy milk fat and a vegetable fatblend is used. For example, the composition comprises a mixture of milk fat and vegetable oils. Preferred fat sources include milk fat, sunflower oil, coconut oil and rapeseed oil. In a specific aspect, the fat in the composition consists of at least 20 w %, preferably at least 30 w %, dairy milk fat.

Preferably, a composition according to the present invention also comprises a source of long-chain polyunsaturated fatty acids, preferably selected from docosahexaenoic acid (DHA), arachidonic acid (ARA), eicosapentaenoic acid (EPA) and/or dihomo-gamma-linolenic acid (DGLA).

The invention also provides a method for providing a nutritional composition according to the invention. In one embodiment, such method comprises the steps of:
a. Blending skimmed milk and a whey protein source comprising α-lactalbumin and β-lactoglobulin (and possibly other whey proteins),
b. Pasteurization of the blend at a temperature of less than 85° C.,
c. Evaporation at a temperature of less than 68° C.,
d. Addition of a fat source,
e. Homogenization,
f. Spray drying to obtain a powdered composition, and
g. Optionally reconstituting the powdered composition with a liquid Prior to blending with the whey proteins, the skimmed milk may be treated with ceramic membrane filtration to reduce the bacterial count. To ensure optimal digestibility of the milk proteins, the method preferably does not comprise exposing α-lactalbumin and β-lactoglobulin to conditions that induce denaturation and/or aggregation of α-lactalbumin and β-lactoglobulin. In a specific aspect, at least 95% of α-lactalbumin and β-lactoglobulin are native. Preferably the pasteurization step is done at a temperature of less than 80° C., more preferably between 70 and 80° C.

The source of α-lactalbumin and β-lactoglobulin can be cheese whey, acid whey or milk serum obtained via membrane filtration, optionally wherein the whey is treated with ceramic membrane filtration to reduce the bacterial count. For example, the composition comprises demineralized whey, a whey protein concentrate or a milk serum concentrate, fractions, or combinations thereof. For example, an aLac- or milk phospholipid-enriched WPC can be used.

In an alternative embodiment, a method for providing a nutritional composition according to the invention comprises the steps of
a. Preparing a first base powder comprising or consisting of a caseinate-stabilized emulsion with lactose as a carrier.
b. Preparing a second base powder comprising α-lactalbumin and β-lactoglobulin (and possibly other whey proteins), and optionally other milk proteins, minerals and vitamins.
c. Dry blending the powders obtained in steps a and b, optionally together with one or more additives such as nucleotides, oligosaccharides, trace elements, etc.

A composition of the invention is among others characterized in that the fat droplets are coated predominantly with caseins and whey proteins comprising α-lactalbumin and β-lactoglobulin, at an average protein load of 2-10 mg/m$^2$, like 2-6 mg/m$^2$, preferably 3-10 m/m$^2$, like 3-8. In one embodiment, it is below 8 mg/m$^2$, for example in the range of 3-7 mg/m$^2$. In a specific aspect, the protein load is between 3 and 5.5 mg/m$^2$.

Furthermore, the weight ratio of casein:(aLac+bLac) on the fat droplets is at least 4 times higher than the weight ratio of casein:(aLac+bLac) in the total composition. In other words, the caseins in the composition are not distributed evenly across the entire composition but they are enriched/concentrated at the surface of the fat droplets. Since caseins are hydrolyzed very fast under gastric conditions, the fat droplets become instable and start to flocculate to form large fat-containing particles. This creaming process induces a phase separation into an upper fat-enriched phase and a lower low-fat phase. Preferably, the weight ratio of casein:(aLac+bLac) on the fat droplets is at least 4.5 times higher, e.g. at least 4.6, 4.8, 5.0, 5.2 or 5.5 times higher than the weight ratio of casein:(aLac+bLac) in the total composition. In one embodiment, the ratio between (a) the weight ratio of casein:(aLac+bLac) on the fat droplets and (b) the weight ratio of casein:(aLac+bLac) in the total composition is in the range of 4.2-8.0, preferably 4.5-7.5.

The protein load on fat droplets and the ratio of casein:whey protein (aLac+bLac) in a composition and fractions thereof can be determined by methods known in the art using fractionation and taking into account the fat droplet particle size, the protein content and the fat content. If the composition is in a dry form, it is first reconstituted e.g. using demineralized water, to a fat content in the range of 2-10% (w/w). The size distribution of the fat droplets can be determined using a Malvern Mastersizer. The fat droplets are typically separated from the remainder of the composition using density centrifugation. Separation of the protein-coated fat droplets from the remainder of the composition advantageously comprises increasing the density of the liquid phase surrounding the fat droplets. This is suitably done by adding sucrose to the reconstituted composition.

The ratios between caseins and the whey proteins α-lactalbumin+ß-lactoglobulin on the fat droplets and in the total nutritional composition are suitably determined by sodium dodecyl sulfate polyacrylamide gel electrophoresis (SDS-PAGE) under reducing conditions. Therefore, the ratio based on mass ratios would even be slightly higher than ratio based on intensities. The amount of milk protein in the protein bands corresponding to major caseins (e.g. β-casein and α-s-casein), aLac and bLac can be quantified by methods known in the art, for example by a stain free imaging methodology (see also Example 5 herein below). In one embodiment, the protein ratios are determined using a stain free enabled Bio-Rad ChemiDoc XRS+ Documentation System Bio-Rad unit provided with ImageLab software.

Typically, the ratio between the band intensities of caseins and the whey proteins α-lactalbumin and β-lactoglobulin in a total composition of the invention is below 1, and for example ranges from about 0.35 to about 0.95. In contrast, said ratio in the fat fraction comprising protein-coated lipid droplets is generally above 1.5, preferably at least 1.8, like 2.0 or higher, or 3.0 or higher. As a result, the ratio of casein:(aLac+bLac) on the fat droplets is at least 4 times higher, preferably at least 4.5 times higher, than the weight ratio of casein:(aLac+bLac) in the total composition.

A nutritional composition according to the invention can be in the form of a dry, semi-dry or liquid composition. For example, it is a powdered composition which is suitable for making a liquid composition after reconstitution with an aqueous solution, preferably with water.

In another embodiment, it is a liquid composition, for instance a ready-to-consume drinkable or spoonable composition. In a specific aspect, the (semi-) liquid composition has a total protein content up to 30 grams per liter. The relative amounts of casein and whey proteins can vary. In one embodiment, the casein content of composition is up to 20 grams per liter, preferably up to 18 grams per liter.

A nutritional composition according to the invention can be any type of product for use in mammalian nutrition, in particular human nutrition. In view of its unique digestibility properties mimicking the gastric behavior of human milk, it is advantageously an infant formula, a follow-on formula or a growing up milk.

A person skilled in the art will recognize and appreciate that a composition of the invention finds various interesting applications. For example, it is suitably used in a method of controlled release of protein and fat into the intestine of a subject, preferably a human subject. Further uses, which can be either therapeutic or non-therapeutic, include a method to improve gastrointestinal health, a method to improve energy regulation and/or a method to improve metabolic health in a subject. In one embodiment, the invention provides the use of a nutritional composition (obtainable by a method) as herein disclosed in a method of controlled release of protein and fat into the intestine of a subject. Also provided is the use of a nutritional composition in a method to maintain or improve gastrointestinal health, energy regulation and/or metabolic health in a subject. In another embodiment, the invention provides the use of a nutritional composition according to the invention and/or as obtainable in accordance with a method of the invention, in a method to control overall formula digestion kinetics in subject. As used herein, "control overall formula digestion" as used herein is defined as a digestion of a formula wherein the initial amount of fat and protein is lower as compared to the final amount of protein and fat being released to the small intestine. It is believed that such a controlled overall formula digestion helps in preventing accelerated growth of the subject as is normally observed with formula fed subjects when compared to breast fed subjects. The subject is preferably a human subject, more preferably a human subject with an age between 0 and 36 months.

Whey protein contains about 10-15% immunoglobulins or antibodies. Immunoglobulins are a protective antibody family found in whey. A further application of a "low heat processed" composition of the invention relates to the fact that it contains a relatively high level of intact and functionally active cow's milk immunoglobulins, which are known to have health-promoting effects in humans. More in particular, milk immunoglobulins can prevent the attachment of pathogen to the epithelial lining that is a critical step in the establishment of infection. It has been reported that orally administered bovine colostrum or milk immunoglobulins have proven effective in the prevention of orally mediated infections. Clinical studies have been undertaken to evaluate the potential of immune milk products as preventative treatment for various hospital infections, especially those caused by antibiotic resistant bacteria and *Helicobacter pylori*, the causative agent of chronic gastritis. El-Loly (Int. J. of Dairy Science, Volume 2 (3): 183-195, 2007) reviewed the properties of bovine immunoglobulins, their isolation from colostrum and utilization in the preparation of bovine immune milk for prevention and treatment of microbial infections in humans and animals.

Accordingly, the present invention also provides a nutritional composition for use as "immune milk product", among others in a method for the prevention or treatment of microbial infection in a subject, preferably a human subject, more preferably a human subject with an age between 0 and 36 months. Preferably, the nutritional composition is pasteurized at a temperature between 70 and 80° C. In one embodiment, the microbial infection is a gastrointestinal infection.

LEGENDS TO THE FIGURES

FIG. 1: SDS-PAGE patterns under reducing conditions showing the bands corresponding to casein, aLac and bLac in samples taken from nutritional compositions 1-3 of examples 1-3 and from two commercial infant formula products. Lanes indicated with (P) represent total compositions, and lanes indicated with (F) represent fat fractions thereof comprising protein-coated fat droplets.

Figure 2:
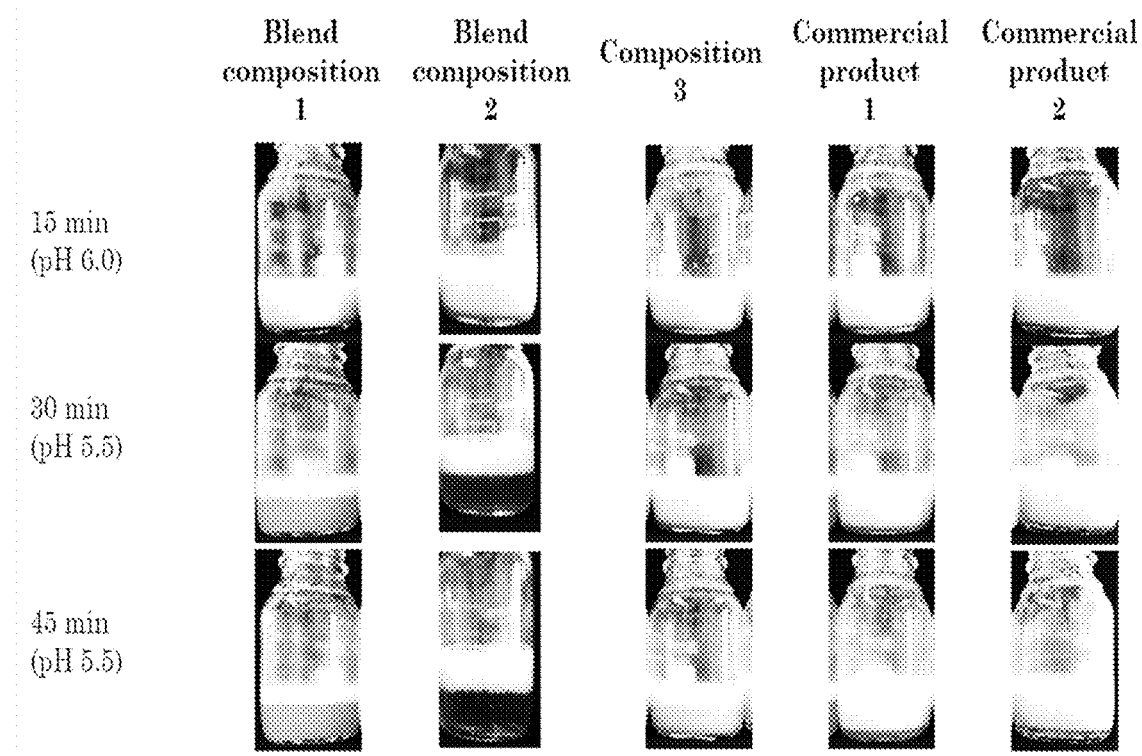

FIG. 2: Photographic images of the macroscopic behavior of infant milks after simulated infant stomach digestion at 37° C. Digestion time and pH are indicated.

FIG. 3: Sum of active IgG, IgA and IgM in IF base powders prepared according to the method described in example 1 and heated at temperatures in the range of 70 to 80° C. The products were prepared and analysed in triplicate. Panel A: absolute concentration in mg/100 g. Panel B: sum of active IgG, IgM and IgA expressed relative to the sum of total initial IgG, IgM and IgA.

Figure 4:
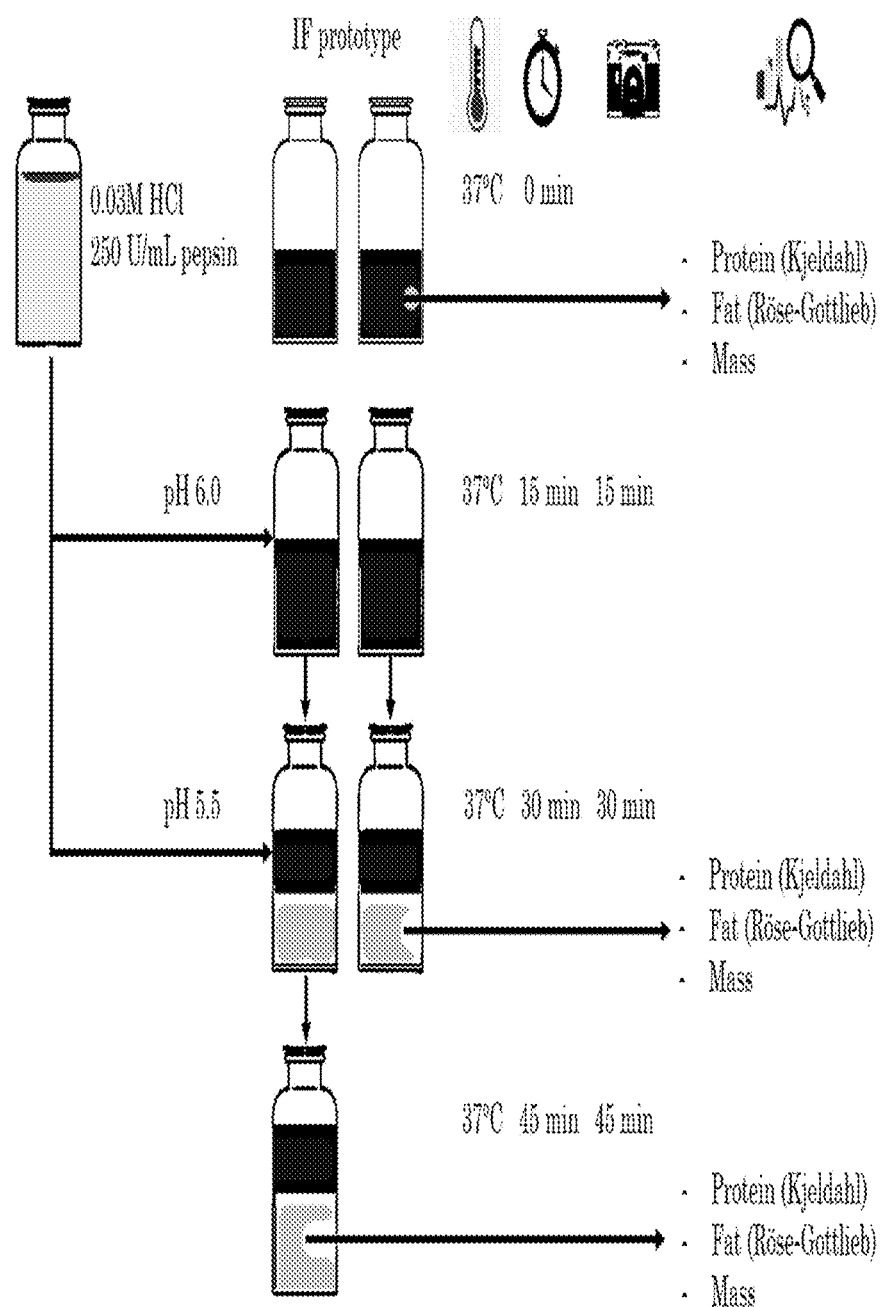

FIG. 4: Illustrates a schematic diagram of an in vitro digestion method according to embodiments.

Figure 5:
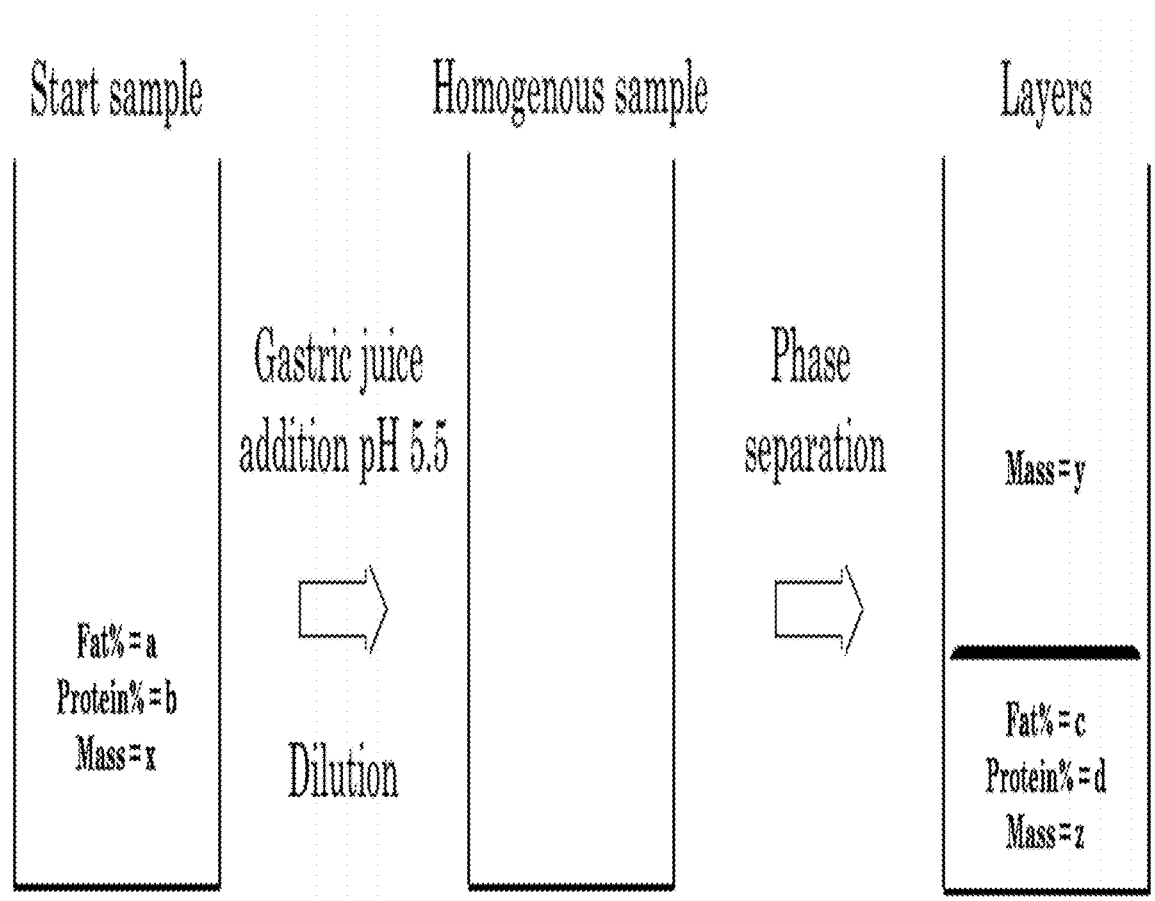

FIG. 5: Illustrates a schematic diagram of an in vitro digestion method according to embodiments.

EXPERIMENTAL SECTION

Example 1: Nutritional Composition Based on Milk Serum

Hiprotal® Milkserum 60 Liquid (FrieslandCampina, The Netherlands) was blended with milk permeate (FrieslandCampina, Lochem The Netherlands) to obtain a milk concentrate with 38 w % protein on total solids. Hiprotal® Milkserum 60 Liquid is a native whey protein concentrate obtained by microfiltration of skimmed milk followed by ultrafiltration of the microfiltration permeate.

The mixture thus obtained was blended with thermized (66° C., 30 sec) and microfiltered skimmed milk, a lactose solution (20% w/w) and pasteurized cream (85° C., 30 sec). The composition of the blend is presented in Table 1.

TABLE 1

| composition of blend before evaporation | |
|---|---|
| Solids | 21.3% |
| Fat | 4.5% |
| Protein | 3.3% |
| Casein | 1.3% |
| Whey protein | 1.9% |

The blend was then heated at 72.8° C. for 30 seconds, directly followed by evaporation until 44.5% dry matter by making use of a mechanic vapor recompression (MVR) evaporator with a steam temperature of 65° C. After cooling, minerals and vitamins were added and the concentrate so obtained was heated up to 74° C. unless otherwise stated. Vegetable fat was injected, followed by a 2-step homogenization at 120/30 bar. The emulsion was then spray dried at an air inlet temperature of 177° C., an air outlet temperature of 91.0° C. and a nozzle pressure of 185 bar. See Table 2 for the recipe of the resulting IF base powder. This product will further be referred to as Composition 1.

TABLE 2

| IF base powder recipe (per 100 kg powder) | |
|---|---|
| Ingredient | Weight [kg] |
| Hiprotal Milk Serum 60 | 64.9 |
| Milk permeate | 87.1 |
| CMF-treated skimmed milk | 15.0 |
| Cream pasteurized | 43.2 |
| Lactose | 31.1 |
| Vegetable fatblend | 17.2 |
| Tripotassium citrate monohydrate | 0.25 |
| Calcium carbonate | 0.43 |
| Magnesium chloride hexahydrate | 0.20 |
| Tricalcium phosphate | 0.11 |
| Trisodium citrate dihydrate | 0.16 |
| Calcium hydroxide | 0.03 |
| Premix vitamins | 0.45 |
| Taurine | 0.06 |

Example 2: Nutritional Composition Based on Cheese Whey

Deminale 90 Liquid (FrieslandCampina Domo, The Netherlands), a >90% demineralized, concentrated and pasteurized (77° C., 30 sec) cheese whey product, was blended with thermized and microfiltered (68° C., 20 sec) skimmed milk and pasteurized cream (85° C., 30 sec). The composition of the blend is presented in Table 8 below.

TABLE 3

| Blend composition before evaporation. | |
|---|---|
| Solids | 21.5% |
| Fat | 4.3% |
| Protein | 3.5% |
| Casein | 1.4% |
| Whey protein | 2.0% |

The blend was then heated at 72.8° C. for 30 seconds directly followed by evaporation till 43.0% dry matter by making use of a mechanic vapor recompression (MVR) evaporator with a steam temperature of 65° C. After cooling, minerals and vitamins were added and the concentrate so obtained was heated up to 74° C., vegetable fat was injected followed by a 2-step homogenization at 120/30 bar. The emulsion was then spray dried at an air inlet temperature of 176° C., an air outlet temperature of 89.3° C. and a nozzle pressure of 170 bar. See Table 4 for the recipe of the resulting IF base powder. This product will further be referred to as Composition 2.

TABLE 4

| IF base powder recipe (per 100 kg powder) | |
|---|---|
| Ingredient | Weight [kg] |
| Skimmed milk thermized | 147.3 |
| Demineralized whey concentrate | 168.1 |
| Cream pasteurized | 39.9 |
| Vegetable fatblend | 17.2 |
| Tripotassium citrate monohydrate | 0.67 |
| Calcium carbonate | 0.51 |
| Magnesium chloride hexahydrate | 0.29 |
| Tricalcium phosphate | 0.17 |
| Trisoclium citrate clihydrate | 0.12 |
| Calcium hydroxide | 0.037 |
| Premix vitamins | 0.53 |
| Taurine | 0.068 |

Example 3: Large Scale Production with Milk Concentrates

A 45% (w/w) lactose solution was prepared by blending lactose with water of 80° C. Refit® MCI 80 TL (micellar casein isolate from FrieslandCampina; 18% solids, 80% protein on total solids with approximately 92% casein on total protein) was added to the lactose solution, followed by the addition of Hiprotal® Milkserum 60 Liquid (FrieslandCampina, The Netherlands; appr. 30% solids and 60% protein on total solids). Thereafter, a blend of minerals and vitamins was added, followed by the addition of anhydrous milk fat and a vegetable fat blend comprising fat soluble vitamins, beta-carotene and anti-oxidant.

This mixture was then homogenized at 60/20 bar and heated to 77° C. with a scraped heat exchanger with an overall residence time of 53 seconds, directly followed by spray drying at a Filtermat spray dryer. The air inlet temperature was 182° C. and the air outlet temperature was 82° C. The nozzle pressure was 153 bar. Afterwards, the base powder was blended with Lactose, GOS Powder (Vivinal®), Maltodextrin, DHA and ARA (Vana Sana) and premixes containing trace elements and nucleotides.

Table 5 shows the recipe of the IF base powder and the recipe of the final nutritional composition is presented Table 6. This product will further be referred to as Composition 3.

TABLE 5

| IF base powder recipe (per 100 kg powder) | |
|---|---|
| Ingredient | Weight [kg] |
| Hiprotal Milk Serum 60 | 67.3 |
| Refit ® MCI 80 TL | 10.4 |
| Lactose | 39.7 |
| Vegetable fatblend | 16.1 |
| Anhydrous milk fat | 19.9 |

TABLE 5-continued

IF base powder recipe (per 100 kg powder)

| Ingredient | Weight [kg] |
|---|---|
| Tripotassium citrate monohydrate | 1.3 |
| Tricalcium phosphate | 0.78 |
| Magnesium chloride hexahydrate | 0.37 |
| Sodium chloride | 0.44 |
| Calcium hydroxide | 0.035 |
| Potassium hydroxide | 0.15 |
| Potassium chloride | 0.017 |
| Premix Vitamins (water soluble) | 0.27 |
| Taurine | 0.075 |
| Premix Vitamins (fat soluble) | 0.031 |
| Beta-carotene | 0.0013 |
| Premix anti-oxidant | 0.036 |

TABLE 6

Infant formula recipe (per 100 kg powder)

| Ingredient | Weight [kg] |
|---|---|
| Base powder (see table 5) | 73.5 |
| Lactose | 17.0 |
| Vivinal ® GOS Powder Maltodextrin | 6.6 |
| Premix trace elements | 1.00 |
| Vana Sana DHA | 0.75 |
| Vana Sana ARA | 0.45 |
| Choline Bitartrate | 0.34 |
| Premix Vitamins | 0.19 |
| Premix Nucleotides | 0.17 |

Example 4: Characterization of Protein-Coated Fat Droplets

This example describes the analysis of the average fat droplet size and the specific surface protein load of the fat droplets.

All nutritional compositions according to examples 1-3 herein above, further referred to as compositions 1-3, were reconstituted at approximately 3.0% fat w/w in demineralized water to obtain a liquid nutritional composition. A Malvern Mastersizer 3000 was used to measure the fat globule distribution at 24° C. The refractive index of the dispersed phase was set on 1.46, whereas the refractive index of the continuous phase was set on 1.33. The absorption coefficient was set on 0.01. Prior to fat globule size measurements, 2 ml infant milk sample was mixed with 40 ml water and 5 ml of a solution consisting of 0.125% Tween-20 and 1.5% ETDA to dissociate the casein micelles, and the mix was incubated for 10 minutes.

In order to separate the fat globules from the remainder of the composition, sucrose was added to increase the density difference between the fat globules and the serum phase. After sucrose addition, the solution contained 13.0 w/w % carbohydrates. This solution was then centrifuged for 60 min at 100,000×G at 21° C. in a Beckman/Coulter Avanti J-310 using a swing out rotor JS-24,38.

Three fractions were obtained after centrifugation. The upper fat layer (fat disc) was gently removed using a small spatula. The pellet was loosened and suspended again in the serum phase by stirring on a stirring plate at room temperature till all the lumps were dissolved. The masses of both the fat disc and subnatant (serum phase+pellet) were determined.

The total protein contents [w/w %] of the infant milk, fat disc and subnatant were determined using the Kjeldahl method by determining the total nitrogen and multiplying it by a factor of 6.38. Rose Gottlieb was used to determine the total fat contents [w/w %] of the infant milk, fat disc and subnatant.

The fat globule volume and surface specific area were calculated from the $d_{3,2}$ [μm] obtained from the particle size measurement, and a fat density of 0.91515 g/ml was used to convert the fat volume in fat mass. The protein load (PL) [mg/m$^2$] was measured according to the following equation:

$$PL = \frac{\text{Protein content of fat disc}}{\text{Fat content of fat disc}} \cdot \frac{1000}{SSA}$$

whereby SSA=surface specific area [m$^2$/g].

Example 5: Determining the Casein to Whey Protein Ratio on the Fat Globule Surface The ratios between caseins and whey proteins (α-lactalbumin+ß-lactoglobulin) in the infant milks and the fat discs as obtained in Example 4 were determined by sodium dodecyl sulfate polyacrylamide gel electrophoresis (SDS-PAGE) making use of a Laemmli based buffer system and the stain free imaging methodology using a stain free enabled Bio-Rad ChemiDoc XRS+Documentation System Bio-Rad unit provided with ImageLab software. Isolated fat discs were dissolved 2% SDS/10 mM citrate solution in demiwater. To one single fat disc, originating from 21 mL of infant milk, 8.4 mL of SDS/citrate solution was added and the mixture was incubated up to 2 hours at 60° C. to get the fat and protein dissolved. During incubation samples were regularly mixed by circling by hand and twice by pipetting up and down using a 10 mL serological pipet.

For running SDS PAGE/electrophoreses, samples were diluted to a protein concentration of 2 mg/mL by addition of demiwater. Electrophoresis was performed under reducing condition for which 90 μl of the diluted 2 mg/mL sample was mixed with 100 μl 2× Laemmli sample buffer (Bio-rad, catno. 1610737) and 30 μl 1M DTT solution (Sigma, catno. 646563) followed by heating at 90° C. for 10 minutes using a Bio-Rad digital dry bath. Heated samples were centrifuged for 4 minutes at 14,000 rpm at room temperature and the subnatant was used for SDS-PAGE analysis.

A 5 uL volume of the 1 mg/mL reduced sample, containing about 5 ug protein was loaded on Bio-Rad Criterion TGX stain-free 4-15% precast gel.

An unstained molecular weight marker (Bio-rad, catno. 1610363) was included to identify the major milk proteins. Electrophoresis was performed in 1× Tris/Glycine/SDS electrophoresis buffer (Bio-Rad, catno. 1610732) at room temperature at constant Voltage (V): 100V for 10 minutes followed by another 45 minutes at 150V. After electrophoresis the gel was removed from the frame, rinsed for 5 seconds in demi water and immediately imaged starting with 5 minutes of UV activation and followed by several exposure times (intense, faint, 10 s). Results are shown in FIG. 1.

The final images were analyzed with the Analysis Tool Box from the ImageLab software. Lanes were selected to discriminate between the samples on a gel and bands were selected within the lanes for the specific casein and whey proteins. Per specific protein the volume intensities were determined. Infant milk samples and its fat fraction were always examined on the same gel. For each product, the total intensities of all casein bands were calculated, as well as the total intensities of the α-lactalbumin+ß-lactoglobulin bands. The ratio of the first value was then divided by the second one to obtain a casein:(aLac+bLac) ratio.

Since the proteins to be analyzed contain different amounts of tryptophan, the band intensities do not exactly correspond to their masses. For example, based on weight, aLac gives most intense bands and caseins the least intense. If the ratio between aLac and bLac in the starting product and the fat fraction comprising the fat droplets are equal, this does not matter for the casein:(aLac+bLac) ratio between the fat droplets and total composition. However, if the fat fraction contains relatively more aLac, the ratio based on mass ratios would even be slightly higher than ratio based on band intensities.

Example 6: In Vitro Analysis of Phase Separation Under Stomach Conditions

In order to assess the digestive properties of a nutritional composition of the invention, an in vitro infant digestion screening method was developed. Scheme 1, shown in FIGS. 4 and 5, provides a schematic outline of the in vitro digestion method. Briefly, the method simulates infant stomach digestion after ingestion of infant formula or human milk, where after macroscopic behavior is observed and distribution of fat and protein is measured.

Before starting the experiment, the base powders from examples 1 and 2 (compositions 1 and 2, respectively) were dry blended with lactose and WPC35 (Hiprotal® 35, FrieslandCampina) according to:

|  | Blend composition 1 | Blend composition 2 |
|---|---|---|
| Composition 1 | 74.0% |  |
| Composition 2 |  | 75.0% |
| WPC35 | 4.3% |  |
| Lactose | 21.7% | 25.0% |

The powdered compositions were reconstituted in demineralized water. The liquid infant milk samples were standardized based on fat concentration comparable to infant milk levels, i.e. about 3.0 to 3.5 w %. Gastric juice was prepared by dissolving pepsin (porcine) in 30 mM HCl solution to 250 U/ml. A buffer curve was made for each sample to determine the amount of gastric juice needed to reach pH 6.0 and 5.5. Prior to the addition of gastric juice, samples were taken for protein and fat analyses.

Duplicate samples of 60 mL were heated up to 37° C. The experiment was started by adding gastric juice to pH 6.0 according to the predefined buffer curve. Samples were manually stirred for a few seconds to mix gastric juice with the sample and then incubated for 15 minutes. Thereafter, the pH was lowered to pH 5.5 with gastric juice. After lowering of the pH, both samples were stirred simultaneously and one sample was incubated for 15 minutes and the other for 30 minutes at 37° C. Afterwards, a photographic image was taken. Aliquots were taken from the bottom layers for analysis of protein and fat content. The enzymatic reaction was terminated by the addition of a Pepstatin A stock solution (0.02 gram Pepstatin A, 18 mL methanol, 2 mL glacial acetic acid).

To obtain information about the speed and extent of separation and creaming, images were taken at different time points. In addition, the upper layer was removed carefully and both the masses of upper layer (y) and bottom layer (z) were determined to calculate the mass distribution of the top and bottom layer at the specified time point at pH 5.5 according to:

$$\% \text{ of total mass in bottom layer} = \frac{z}{(y+z)} \cdot 100\%$$

Protein and fat concentrations in the bottom layer were used as indication for the initial flux of nutrients that would be emptied from the stomach at the specified time point at pH 5.5. The relative amounts of fat and protein in bottom layer were calculated according to:

$$\% \text{ of total fat in bottom layer} = \frac{(c \cdot z)}{(a \cdot x)} \cdot 100\%$$

$$\% \text{ of total protein in bottom layer} = \frac{(d \cdot z)}{(b \cdot x)} \cdot 100\%$$

In which:
a=fat % in start sample
b=protein % in start sample
c=fat % in bottom layer
d=protein % in bottom layer
y=mass of top layer (in g)
z=mass of bottom layer (in g)

1 Results
1.1 Product Composition

The composition of the products is presented below. Besides the trial products according to the invention, also two commercial infant formula products were studied as comparative example.

TABLE 7

| Product composition [g/100 g] | | | | | |
|---|---|---|---|---|---|
|  | Composition 1 | Composition 2 | Composition 3 | Commercial product 1 | Commercial product 2 |
| Protein [N*6.25] | 12.3 | 12.7 | 10.0 | 11.5 | 10.6 |
| Fat | 34.3 | 35.3 | 27.0 | 27.1 | 27.8 |
| Carbohydrates | 44.7 | 45.8 | 55.8 | 53.4 | 52.9 |

1.2 Analysis of Average Fat Droplet Size and Specific Surface Load of Fat Droplets The fat droplet size and specific surface load of fat droplets was determined according to the method described herein above. Table 8 shows the results obtained.

TABLE 8

| Particle size characteristics and specific protein surface load of protein-coated fat droplets | | | | | |
|---|---|---|---|---|---|
|  | Composition 1 | Composition 2 | Composition 3 | Commercial product 1 | Commercial product 2 |
| Particle size distribution | | | | | |
| D[3, 2] μm | 0.37 | 0.39 | 0.59 | 0.37 | 0.42 |
| D[4, 3] μm | 0.75 | 0.71 | 0.98 | 0.69 | 0.95 |
| Protein load (mg/m2) | 3.0 | 4.0 | 3.0 | 3.8 | 6.9 |

The high protein load of commercial product 2 (comparative example) may arise from the denaturation/aggregation of whey proteins, which could be the result of a high heat load.

1.3 Characterization of Casein to Whey Protein Ratio in Total Composition and in Fraction Comprising Protein-Coated Fat Droplets.

Results of SDS-PAGE are presented in table 9 below.

TABLE 9

| | Ratio between band intensities of caseins and (α-lactalbumin + β-lactoglobulin) | | Ratio fat fraction/total composition |
|---|---|---|---|
| | Total composition | Fat fraction | |
| Composition 1 | 0.40 | 2.0 | 5.0 |
| Composition 2 | 0.90 | 5.0 | 5.6 |
| Composition 3 | 0.45 | 2.1 | 4.6 |
| Commercial product 1 | 0.67 | 2.6 | 3.8 |
| Commercial product 2 | 0.66 | 1.2 | 1.8 |

1.4 In Vitro Analysis of Phase Separation Under Stomach Conditions

Photographic images taken at different timepoints and pH during gastric digestion (see FIG. 2) show a clear phase separation of the minimal heat-treated products of the compositions of the invention at pH 5.5, whereas the commercial products do not.

Table 10 shows the mass of the bottom layer (% of total mass) and the percentages of total protein and total fat therein after 30 min (column A) or 45 min (column B) in vitro digestion.

TABLE 10

| | % of total mass in bottom layer | | % of total protein in bottom layer | | % of total fat in bottom layer | |
|---|---|---|---|---|---|---|
| | A | B | A | B | A | B |
| Blend composition 1 | 64% | 72% | 46% | 53% | 3% | 3% |
| Blend composition 2 | 45% | 55% | 28% | 35% | 0.2% | 0.3% |
| Composition 3 | 69% | 59% | 57% | 46% | 24% | 7% |
| Commercial product 1 | 0% | 4% | | * | | * |
| Commercial product 2 | 0% | 9% | | * | | * |

* Technically impossible to take a representative sample.

Example 6: Analysis of Immune-Active Bovine Immunoglobulins

Powdered compositions (IF base powders) were prepared according to Example 1 in 3 separate experiments, further referred to as exp 1-3. The concentrates were heated to a temperature in the range of 70 to 80° C. The active immunoglobulin levels (bIgG, bIgA and bIgM) in the blend of skimmed milk, cream and serum protein concentrate before heat treatment and evaporation were measured with ELISA using a commercial ELISA Quantitation sets from Bethyl. Moreover, the immunoglobulin levels were measured in the powders.

Figure 3A:
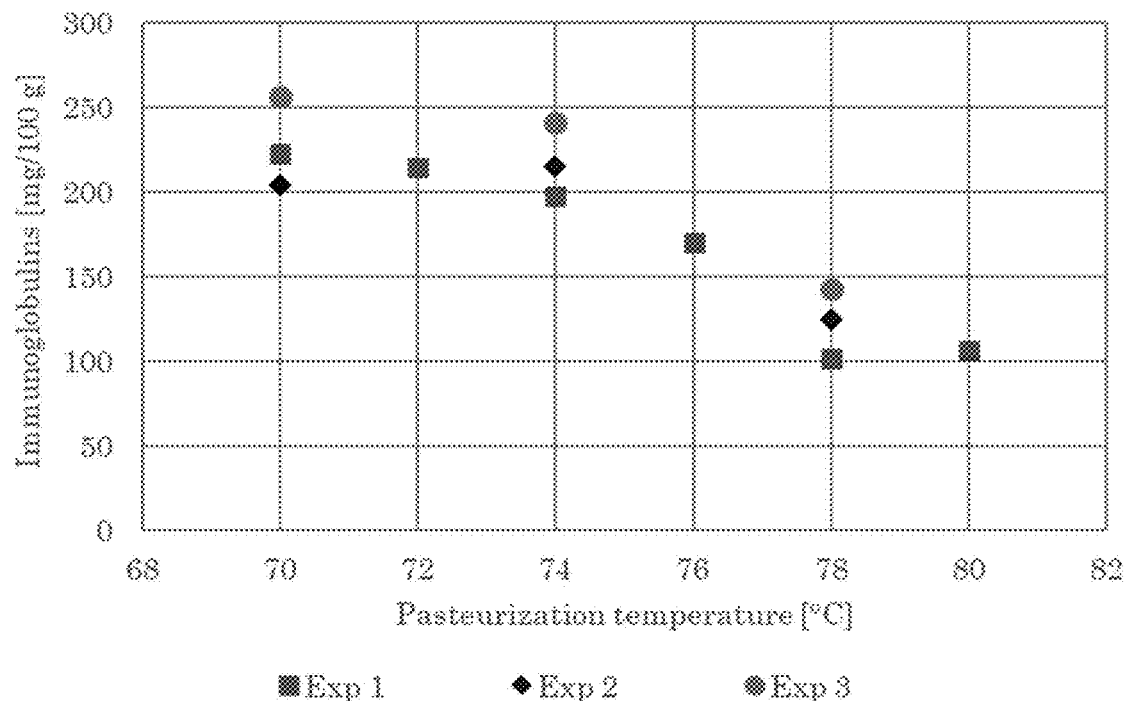
Figure 3B:
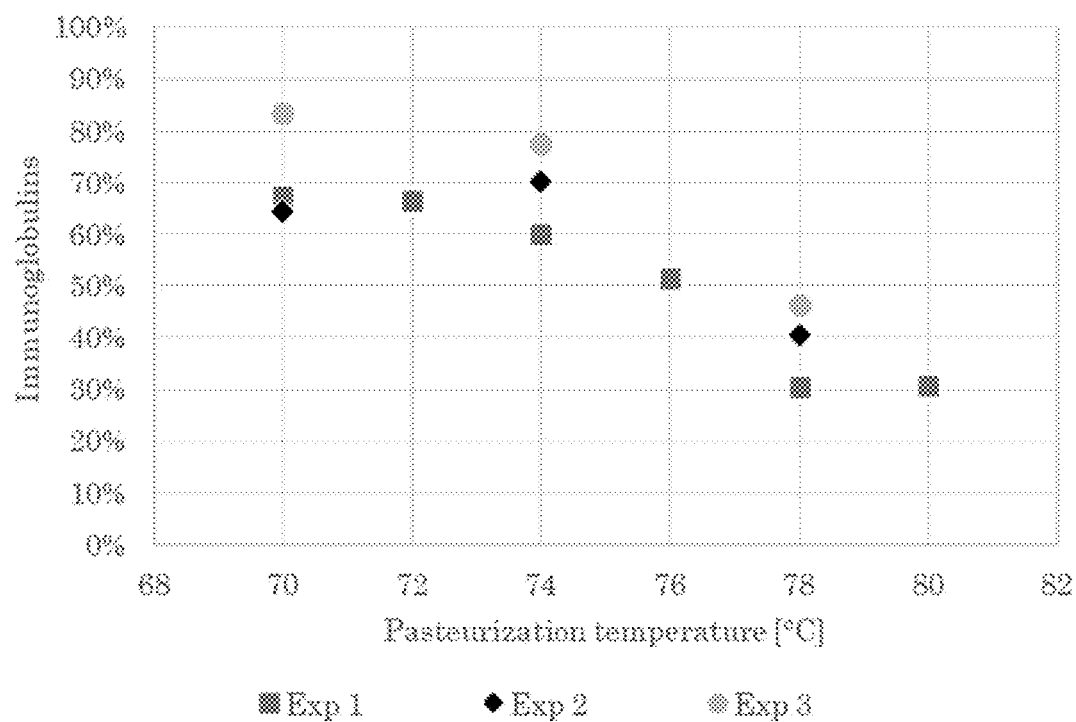

FIG. 3A shows the level of active bovine immunoglobulin in the powdered compositions. FIG. 3B shows the relative amount of immunoglobulins (compared to the blend of the raw materials) that is still active after IF base powder processing.

The invention claimed is:

1. A nutritional composition comprising:
   casein,
   whey protein, and
   protein-coated fat droplets,
   wherein the whey protein includes α-lactalbumin (aLac) and β-lactoglobulin (bLac),
   wherein the protein-coated fat droplets each include a protein coating comprising a portion of the casein, a portion of the aLac, and a portion of the bLac,
   wherein a weight ratio of casein to a total aLac and bLac content in the coating of the protein-coated fat droplets is at least 4 times higher than a weight ratio of casein to a total aLac and bLac content in the total composition,
   wherein the composition includes 5 to 20 wt % total protein content by weight of a total solids of the composition,
   wherein the aLac and bLac present in the composition is in an amount of at least 25 wt % by weight of the total protein content, and
   wherein the composition includes 10 to 50 wt % total fat content by weight of the total solids of the composition.

2. The nutritional composition of claim 1, wherein the protein-coated fat droplets have an average diameter in the range of 0.2 to 1.0 micron.

3. The nutritional composition according to claim 1, wherein at least 70% of the aLac and bLac are in a native state.

4. The nutritional composition according to claim 1, wherein a weight ratio of casein to whey protein in the composition is in the range of 70:30-20:80.

5. The nutritional composition according to claim 1, wherein the aLac and the bLac are derived from milk, from cheese whey, from acid casein whey or from milk serum or from concentrated, diluted, demineralized and/or powdered variants thereof.

6. The nutritional composition according to claim 1, wherein the casein is selected from the group consisting of micellar casein, non-micellar casein, acid casein, calcium caseinate, magnesium caseinate, sodium caseinate, potassium caseinate and ammonium caseinate.

7. The nutritional composition according to claim 1, wherein a fat source of the total fat content is a dairy milk fat, a vegetable oil, a vegetable fat, an, a hydrogenated vegetable oil, a marine oil, an algae oil, single cell oil or a mixture of any of the foregoing.

8. The nutritional composition according to claim 1, wherein a weight ratio of the total fat content to the total protein content is in the range of 3.5:1 to 1:1.5.

9. The nutritional composition according to claim 1, being a powdered composition.

10. The nutritional composition according to claim 1, being a liquid composition.

11. The nutritional composition according to claim 1, being an infant formula, follow-on formula or growing up milk.

12. A method of making the nutritional composition of claim 1, the method comprising:
   a. blending skimmed milk and a whey protein source comprising α-lactalbumin and β-lactoglobulin;
   b. pasteurizing the blend at a temperature of less than 85° C.;
   c. evaporating at a temperature of less than 68° C.;

d. adding a fat source to the blend;
e. after step d, homogenizing the blend;
f. after step e, spray drying the blend to obtain a powdered composition; and
g. optionally reconstituting the powdered composition of step f with a liquid.

13. The method according to claim 12, which does not comprise exposing α-lactalbumin and β-lactoglobulin to conditions that induce denaturation and/or aggregation of α-lactalbumin and β-lactoglobulin.

14. A method of controlling release of protein and fat into the intestine of a subject, the method comprising administering to the subject an effective amount of the nutritional composition of claim 1.

15. A method of maintaining or improving gastrointestinal health, energy regulation and/or metabolic health in a subject, the method comprising administering to the subject an effective amount of the nutritional composition of claim 1.

16. The nutritional composition according to claim 1, wherein at least 95% of the aLac and bLac are in a native state.

17. The nutritional composition according to claim 1, wherein a weight ratio of casein to whey proteins in the composition is in the range of 50:50-30:70.

18. The nutritional composition according to claim 1, wherein a fat source of the total fat content is a dairy milk fat selected from whole milk, cream, anhydrous milk fat and fractions from milk fat.

19. The nutritional composition according to claim 1, being a liquid composition wherein the total protein content of the composition is up to 30 gram per liter.

20. The nutritional composition according to claim 1, wherein the protein-coated fat droplets are coated with an average protein load of 2-10 mg/m$^2$ via the coating.

21. The method of claim 14, wherein the subject is a human subject with an age between 0 and 36 months.

22. The method of claim 15, wherein the subject is a human subject with an age between 0 and 36 months.

23. A method of preventing or treating a microbial infection in a subject, the method comprising administering to the subject an effective amount of the nutritional composition of claim 1.

24. The method of claim 23, wherein the subject is a human subject with an age between 0 and 36 months.

25. The method of claim 23, wherein the microbial infection is a gastrointestinal infection.

* * * * *